United States Patent [19]

Fradenburgh

[11] Patent Number: 4,655,685
[45] Date of Patent: Apr. 7, 1987

[54] HELICOPTER MAIN ROTOR BLADE HAVING A SHORT SPAN SLOT NEAR THE TIP END

[75] Inventor: Evan A. Fradenburgh, Fairfield, Conn.

[73] Assignee: United Technologies Corporation, Hartford, Conn.

[21] Appl. No.: 809,460

[22] Filed: Dec. 16, 1985

[51] Int. Cl.⁴ .............................................. B64C 27/64
[52] U.S. Cl. ..................................... 416/90 A; 416/24
[58] Field of Search ................. 416/23, 24, 90 A, 500, 416/20 R, 242, DIG. 2

[56] References Cited

U.S. PATENT DOCUMENTS

| | | | |
|---|---|---|---|
| 3,395,760 | 8/1968 | Hoffman | 416/23 X |
| 3,525,576 | 8/1970 | Dorand | 416/24 X |
| 3,547,377 | 12/1970 | Frey | 416/24 X |
| 3,588,273 | 6/1971 | Kizilos | 416/42 |
| 3,816,019 | 6/1974 | Norman et al. | 416/90 A X |
| 3,902,821 | 9/1975 | Robinson | 416/242 X |
| 3,938,762 | 2/1976 | Murphy | 416/500 X |
| 3,954,229 | 5/1976 | Wilson | 416/500 X |
| 4,028,003 | 6/1977 | Krauss | 416/242 X |
| 4,130,377 | 12/1978 | Blackwell | 416/132 R |
| 4,132,500 | 1/1979 | Reader et al. | 416/90 A X |
| 4,248,572 | 2/1981 | Fradenburgh | 416/242 X |
| 4,392,781 | 7/1983 | Mouille et al. | 416/DIG. 2 X |
| 4,493,612 | 1/1985 | D'Anna | 416/20 R |
| 4,507,050 | 3/1985 | Jeffery et al. | 416/90 A |
| 4,534,702 | 8/1985 | Johnson et al. | 416/90 A X |
| 4,573,871 | 3/1986 | Krauss et al. | 416/90 A X |

FOREIGN PATENT DOCUMENTS

| | | |
|---|---|---|
| 3210498 | 10/1983 | Fed. Rep. of Germany ........ 416/23 |
| 2090214 | 7/1982 | United Kingdom . |
| 2145381 | 3/1985 | United Kingdom . |

OTHER PUBLICATIONS

R. W. Prouty, "Pitching Moments have Nothing to do with Batting Averages, Except when they Concern Rotor-Blade Designers", pp. 17–19, 21 & 22, Rotor & Wing International, Aug. 1984.
R. W. Prouty, "Aerodynamics", pp. 14–18, Rotor & Wing International–Jan. 1983.

*Primary Examiner*—E. A. Powell, Jr.
*Attorney, Agent, or Firm*—Gerald E. Linden

[57] ABSTRACT

A helicopter main rotor blade having built-in twist for improved hover performance is provided with a trailing-edge, short span slot near the tip end of the blade for upwardly directing a stream of pressurized air therefrom. The upward ejection of air from the slot untwists the blade, which will enhance the forward flight performance of the blade. A method of modulating the ejection of air from the slot is disclosed for antivibratory control.

3 Claims, 5 Drawing Figures

HELICOPTER MAIN ROTOR BLADE HAVING A SHORT SPAN SLOT NEAR THE TIP END

BACKGROUND OF THE INVENTION

Cyclic (one per rev sinusoidal) blade feathering of helicopter rotor blades provides for attitude control of the helicopter. Higher harmonic blade feathering or nonharmonic localized blade feathering (hereinafter jointly referred to an antivibratory blade feathering) is known to be capable of reducing rotor-induced vibration. Typically, antivibratory blade feathering is superimposed on the cyclic blade feathering through rapid, dynamic inputs to the control servos acting on the swashplate. The primary disadvantage of such techniques resides in the decreased reliability due to increased vibratory loads and motions in the rotor control system, the increased hydraulic or electric power requirement for the control servos, and the weight and cost of the engineering change to correct for these problems.

Some helicopter main rotor blades may have a built-in twist to enhance hover performance. The built-in twist may be thought of as a varying angle of attack for the blade, decreasing (for instance) from ZERO degrees at the blade root to MINUS SIXTEEN degrees at the blade tip. Having a high built-in twist which optimizes hover performance is not compatible with the need for less twist to optimize performance in forward flight, and will increase vibratory air loads.

DESCRIPTION OF THE INVENTION

It is an object of this invention to provide a technique for reducing rotor induced vibrations by altering the built-in twist of a helicopter main rotor blade during forward flight.

According to the invention, a helicopter main rotor blade having built-in twist for improved hover performance is provided with a trailing-edge, short span slot near the blade tip for upwardly directing a stream of pressurized air therefrom. The upward ejection of air from the slot produces a nose-up pitching moment on the airfoil (rotor blade) which will serve to untwist the blade. This will enhance the forward flight performance of the blade. By modulating the flow of pressurized air as a function of blade azimuth, a modulated angle of attack and blade lift will result. With suitable modulation, rotor-induced vibrations will be substantially reduced.

Other objects, features, and advantages of the invention will become apparent in light of the following description thereof.

BEST MODE FOR CARRYING OUT THE INVENTION

Figure 1:
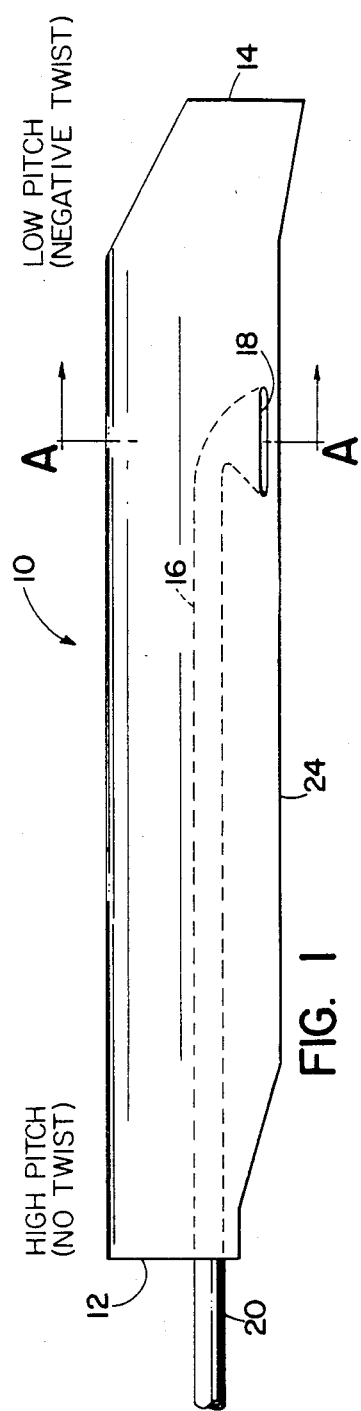
FIG. 1 is a top view of a helicopter main rotor blade, incorporating the invention.
Figure 2:
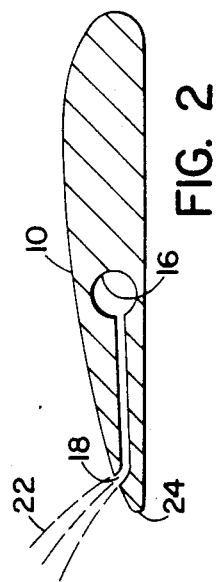
FIG. 2 is an end cross-sectional view of the blade of FIG. 1.

FIGS. 1 and 2 show, respectively, a top view and end cross-sectional view of a fully cambered airfoil 10, such as the Sikorsky SC1095 airfoil. Cambered airfoils are discussed in R. W. Prouty, *Aerodynamics,* Rotor & Wing International, August 1984, pp. 17-22. The blade 10 has a built-in twist for enhanced hover performance. That is, it has little or no twist (a greater geometric pitch angle) at its root end 12 and is negatively twisted (a lesser geometric pitch angle) at its tip end 14.

The blade 10 has an internal, radial air-passageway 16 extending from its root end 12, longitudinally, nearly to the tip end 14 of the blade. A short, narrow slot 18 is provided near the tip end 14 of the blade 10, for instance at EIGHTY PERCENT of radius. The slot 18 extends chordwise into the blade 10 so as to be in airflow communication with the radial passageway 16. A flexible receiver duct 20 at the root end 12 of the blade 10 communicates pressurized air from a plenum located at the rotorshaft (described hereinafter), via the passageway 16, to the slot 18.

As best viewed in FIG. 2, a chordwise end-section on the line A-A through the slot 18, the slot 18 is designed to eject air 22 at an upward angle from the trailing edge 24 of the blade 10.

The upward ejection of air from the trailing edge of the blade will decrease lift. In other words, it would seem as though the blowing is in the wrong direction to increase performance. However, by blowing upwardly from the trailing edge of the blade, the trailing edge 24 is forced down, the negative built-in twist is reduced because of the torsional flexibility of the blade, and a positive pitch change (greater angle of attack) is induced which will increase lift. By suitably configuring the slot, its spanwise location, and controlling the magnitude of the blowing, the lift increase resulting from the positive pitch change can overwhelm the lift decrease resulting from the "wrong way" blowing, for instance by a factor of FIVE. It turns out that very little blowing, on the order of FIVE to TEN psi will produce the desired magnitude of twist dhange. The net result then of the described blowing is to untwist the blade at the tip end 14, for instance by ONE to TWO DEGREES, with corresponding proportional untwisting along the length of the blade as a function of blade torsional softness, which will enhance the performance and lower the stresses on the blade in forward flight. In hover there is no blowing and good performance is achieved through built-in high twist and blade airfoil camber.

Untwisting a blade in flight is not new, per se. For instance Kaman Corporation uses a servoflap on the outboard trailing edge of the blade for cyclic and collective control. However, it is immediately apparent that Kaman's mechanical control system is directed to an entirely different purpose than the air ejection slot of the present invention, i.e. improved forward flight preformance and antivibratory control.

A simple ON/OFF system for blowing, using any known suitable system of providing pressurizied air to the blade, will enchance the forward flight characteristics of a blade having built-in twist (with the air switched ON) while maintaining improved hover performance (with the air switched OFF). However, a system delivering modulated air pressure as a function of airspeed and blade azimuth has the added benefit of being able to reduce rotor induced vibrations by untwisting the blade in a controlled manner.

A mechanism for modulating air delivery to a helicopter main rotor blade is disclosed in commonly-owned U.S. Pat. No. 4,493,612, entitled AXIALLY SLIDEABLE PLENUM FOR CIRCULATION CONTROL AIRCRAFT and No. 4,507,050, entitled PNEUMATIC VALVE CONTROL FOR CIRCULATION CONTROL AIRCRAFT, which are systems designed for use on the Sikorsky "X-wing" aircraft.

Figure 3:
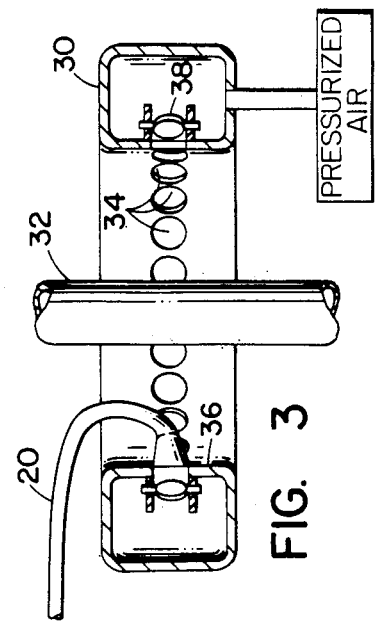
FIG. 3 is a side cross-sectional view of a modulated air distribution system of the prior art.

In the arrangement of FIG. 3 a nonrotating, pressurized, doughnut-like plenum 30 is disposed coaxially about a rotorshaft 32. Openings 34 are disposed at regular intervals about the inner circumferential wall 36 of the plenum. The receiver ducts 20 from the root end of each blade are presented serially to the openings 34 as the rotor rotates to receive pressurized air therefrom. To reduce transients, from opening-to-opening, the receiver duct may span two openings. A valve 38 is associated with each opening for regulating the pressure delivered to the receiver duct of each blade.

It should be understood that the aforementioned X-wing patents disclose two banks of valves, one bank for a leading edge slot and one bank for a trailing edge slot, and that the slots in the X-wing aircraft blade extend substantially along the length of the blade. The present invention requires only one bank of valves for its trailing-edge, short span, tip-located slot. Furthermore, the X-wing aircraft uses blowing to alter the blade environment apparent blade angle of attack, whereas the present invention uses blowing to alter actual blade angle of attack.

The plenum arrangement of FIG. 3 most nearly resembles the arrangement of the aforementioned U.S. Pat. No. 4,507,050, for descriptive simplicity. However, the plenum arrangement of the aforementioned U.S. Pat. No. 4,493,612 may be preferable. If all of the valves 38 were to operate in unison a simple speed vs. pressure system, as suggested, could readily be implemented. However, as is known, each valve of the plenum may be independently controlled according to its circumferential position (azimuth). On the X-wing aircraft, this enables cyclic control by delivering azimuth-modulated air to the blades in response to a desired attitude. In the context of the present invention, azimuthal modulation of the air pressure supplied to each blade 10 can be used to implement higher harmonic (more than one per rev sinusoidal) blowing, or blowing only at selected azimuths.

It is well within the reach of modern computer simulation and control to provide the necessary inputs to a system for higher harmonic control. What has been lacking is a feasible mechanical implementation. The present invention is an elegant blend of known technology (the X-wing plenum arrangement) with a readily implemented new blade structure (the trailing edge, upward thrusting air slot of this invention) to achieve antivibratory control along with the previously described enhanced hover/forward-flight characteristics.

Figure 4:
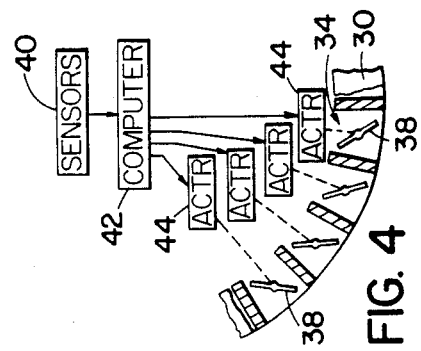
FIG. 4 is a block diagram of a system for higher harmonic control using the invention.

FIG. 4 discloses airframe-mounted sensors 40 for detecting vibration in the aircraft. The outputs of the sensors 40 are provided to a computer 42 controlling the valves 38 so as to cause subtle vibration-cancelling angle of attack changes in each blade 10, by blowing, in closed-loop fashion. This is a very aircraft-dependent function, but is one that will be readily understood and could be readily implemented by any practitioner skilled in the art to which this invention relates.

Figure 5:
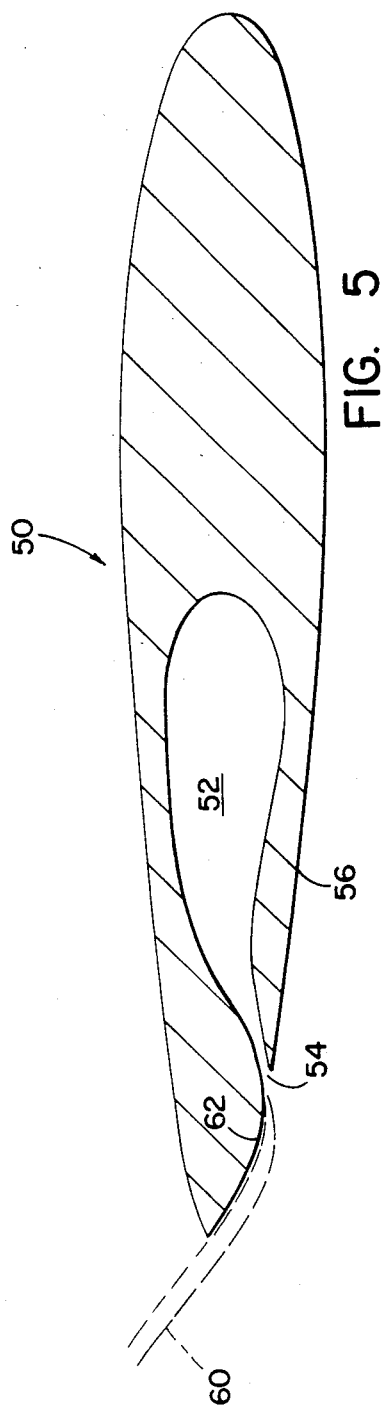
FIG. 5 is an end cross-sectional view of a blade similar to the blade of FIG. 1, showing an alternate slot construction.

FIG. 5 shows an alternate blade construction, which is preferable to the construction shown in FIGS. 1 and 2. As shown in the chordwise cross section of a blade 50, the blade has a suitable radial air-passageway 52 extending from its root end, longitudinally, nearly to the tip end of the blade (similar to the passageway 16 of FIG. 1). A short span slot 54 is provided in the undersurface 56 of the trailing edge 58 of the blade 50 and ejects air 60 around a coanda surface 62 to achieve a similar effect as the aforementioned slot 18.

A similar result could be obtained with a downwardly directed jet of air, but this would produce an undesirable increase in blade twist. The upwardly directed jet provides an average decrease in blade twist.

It bears mentioning that a blade typically has a natural torsional frequency of about seven cycles per revolution. In the context of higher harmonic control this could very well be a benefit since smaller inputs, and hence smaller control loads, may be required to achieve a desired angle of attack change in a blade.

Therefore, I claim as my invention:

1. A helicopter blade having built-in negative twist for enhanced hover performance, comprising:
    air ejection means disposed on the blade for ejecting air from the blade and for reducing the negative built-in twist of the blade while maintaining the overall angle of attack of the blade relatively constant.

2. Apparatus according to claim 1 wherein the air ejection means is a short span longitudinal slot disposed near the tip end of the blade and suitably oriented to eject pressurized air upwardly from the trailing edge of the blade.

3. Apparatus according to claim 1, further comprising:
    sensor means for detecting vibration in the helicopter; and means for modulating the air ejected by the air ejection means in response to the sensor means so as to reduce rotor-induced vibrations.

* * * * *